April 17, 1934.　　　　　L. B. GREEN　　　　　1,954,929
ELECTRIC LIQUID HEATER
Original Filed July 11, 1932　　　3 Sheets-Sheet 1
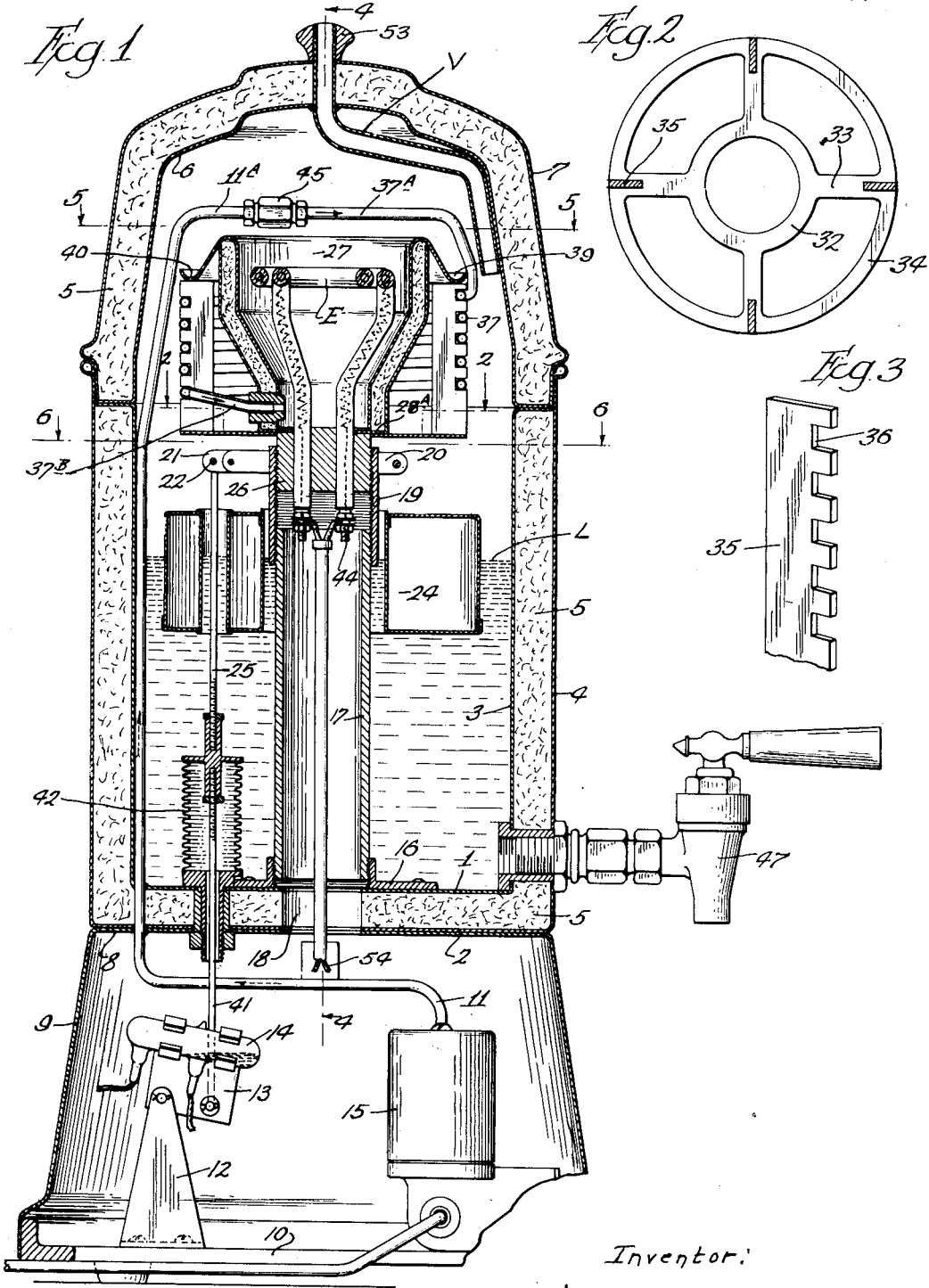
Inventor:
Lee B. Green
by Albert Scheible
Attorney

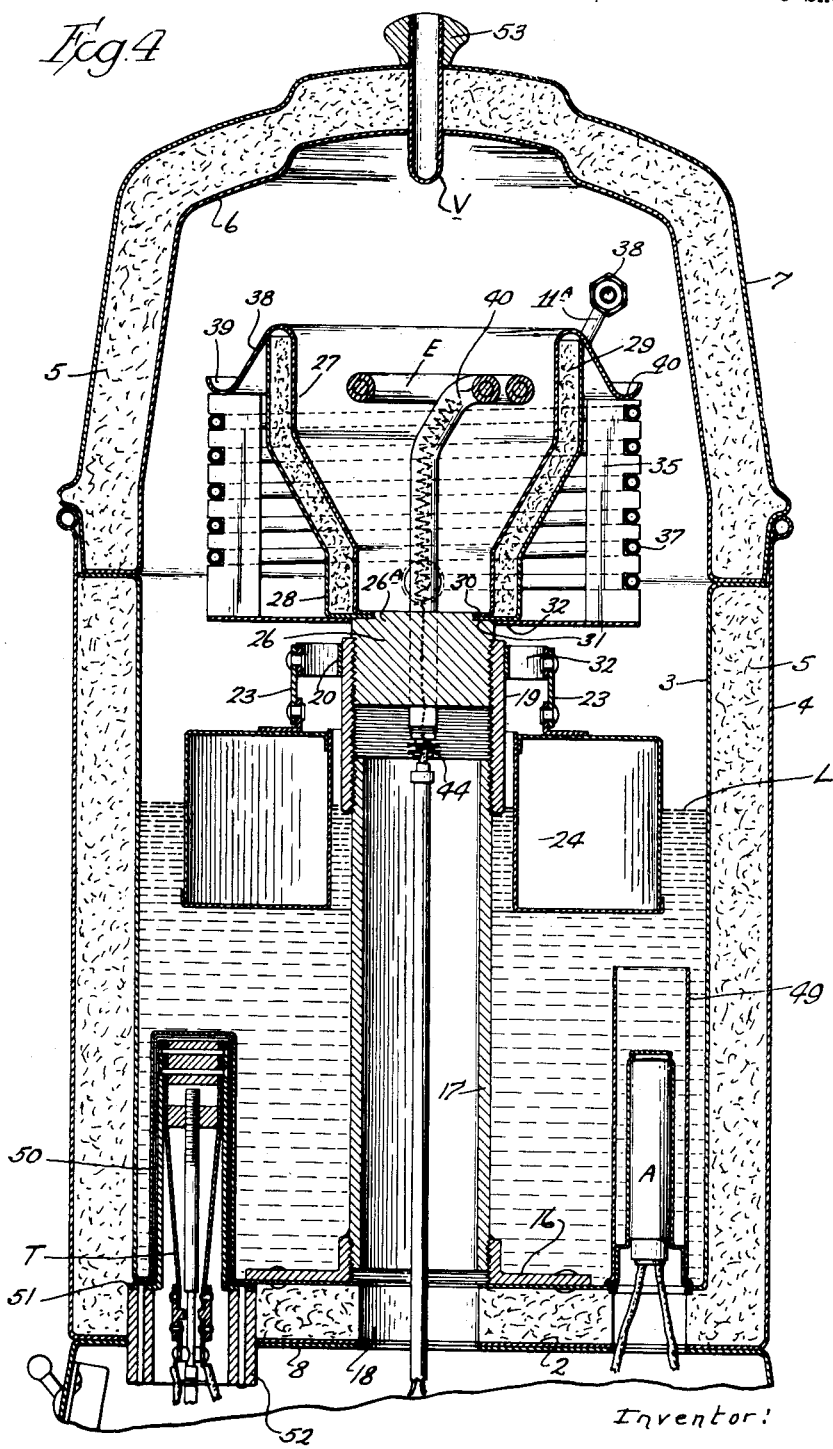

April 17, 1934.   L. B. GREEN   1,954,929
ELECTRIC LIQUID HEATER
Original Filed July 11, 1932   3 Sheets-Sheet 3
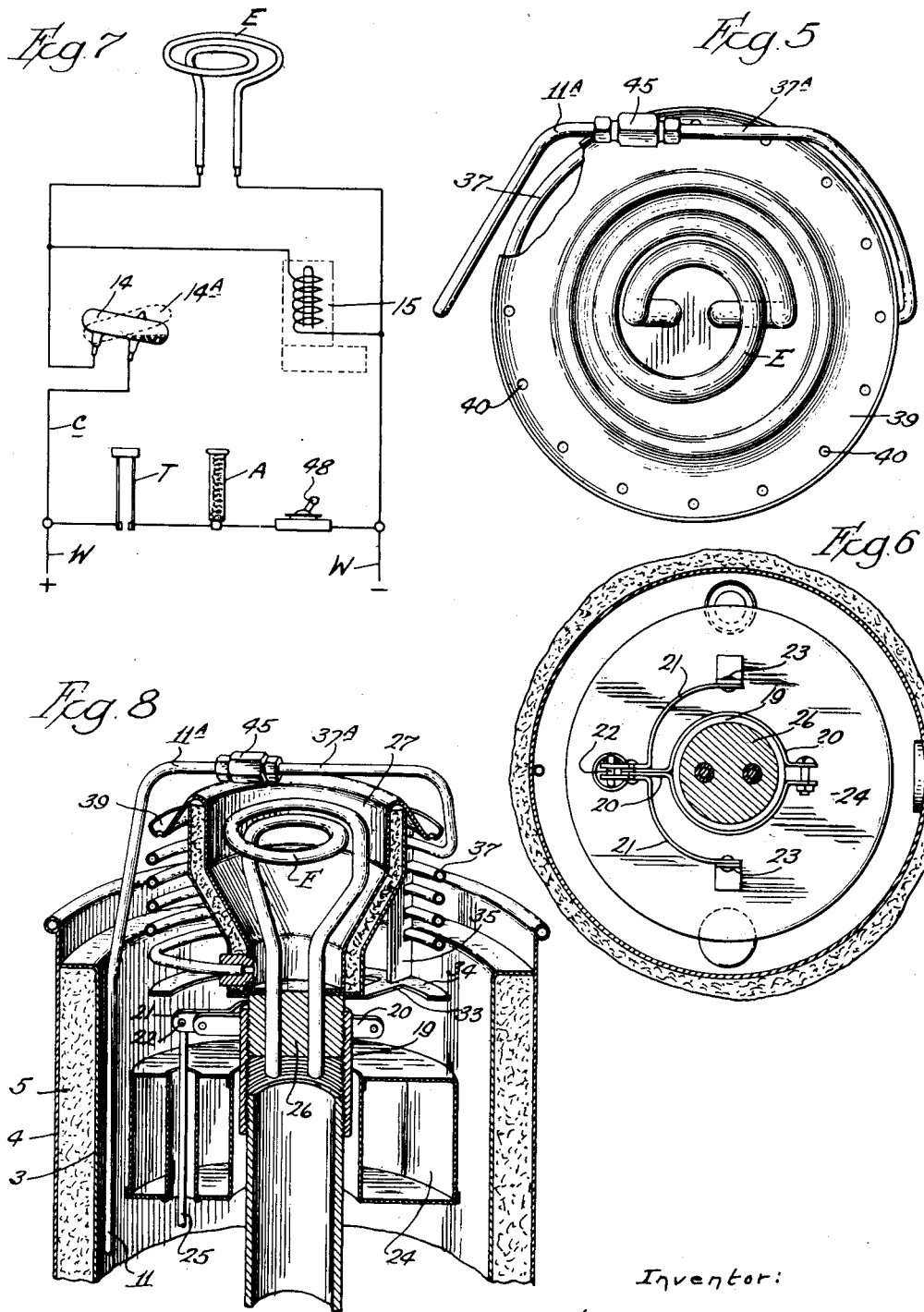

Patented Apr. 17, 1934

1,954,929

UNITED STATES PATENT OFFICE 1,954,929

ELECTRIC LIQUID HEATER

Lee B. Green, Lakewood, Ohio, assignor to The Globe Machine & Stamping Company, Cleveland, Ohio, a corporation of Ohio Application July 11, 1932, Serial No. 621,821
Renewed January 26, 1934

19 Claims. (Cl. 219—38)

In its general aspects, my invention relates to methods and means for speedily and economically converting a supply of cold liquid into a conveniently available and automatically replenished store of hot liquid substantially free of air or other gases which may have been occluded in the cold liquid.

In one of its main objects, my invention relates to an electrically actuated appliance of this class which will boil the liquid and thereafter somewhat reduce the temperature of the liquid before the liquid reaches the storage compartment of the appliance, which will accomplish the said reduction in the temperature of the boiled liquid by preheating additional liquid, and which can easily be varied in the proportions of some of its constituent parts so as to effect this temperature reduction to varying extents.

Moreover, my invention aims to provide an appliance of this class which will have a large capacity for the storing of hot liquid in proportion to the volume of less heated liquid within the appliance, and in which this less heated liquid will have a substantially negligible cooling effect on the stored hot liquid. Also, my invention aims to provide a liquid heating and hot-liquid storing appliance designed to facilitate the assembling of its parts and arranged so as to permit a convenient detaching of certain parts when desired.

Furthermore, my invention relates to a method of obtaining liquid at a substantially predetermined temperature below the boiling point of the liquid, and in this aspect aims to provide a method which will insure an unusually speedy heating action with an economical use of current for the electrical heating of the liquid.

In one of its immediate commercial aspects, the appliance of my invention is particularly suited for use by restaurants, lunch rooms, drug stores and the like for affording a continuously available supply of water at a suitable temperature for preparing coffee, tea, cocoa or other hot beverages. In this aspect, my invention aims to provide a beverage-water supply appliance which will make suitably heated water available within a very short time after the appliance is initially connected to sources of both water supply and electric current, which will automatically discontinue the supply of current whenever a given quantity of the heater water is in its storage compartment, which will have an usually large hot water storage capacity in proportion to the dimensions of the appliance, and which will not emit any considerable amount of moist vapor.

Moreover, my invention aims to provide an appliance of the above recited advantages which will effectively expel air from the water before this water reaches its storage compartment, thereby greatly improving the palatability of many of the beverages prepared with hot water.

Illustrative of my invention and of more detailed objects of the same,

Fig. 1 is a central vertical section through a beverage water heater, with a lower corner portion broken away.

Fig. 2 is a horizontal section along the line 2—2 of Fig. 1, showing portions of the support for the preheating pipe coil.

Fig. 3 is a fragmentary and enlarged perspective view of one of the notched riser elements of the support upon which the preheating coil is wound.

Fig. 4 is an enlarged and fragmentary central and vertical section taken at right angles to Fig. 1, namely along the line 4—4 of that figure.

Fig. 5 is a fragmentary horizontal section taken along the line 5—5 of Fig. 1.

Fig. 6 is a fragmentary horizontal section taken along the line 6—6 of Fig. 1.

Fig. 7 is a diagrammatic view showing the circuit connections.

Fig. 8 is a perspective sectional view of the upper portion of the receptacle of the same beverage heater and of adjacent parts.

In the illustrated embodiment, my water heater includes a two-part container comprising a can-like container body having upper and lower bottom plates 1 and 2 spaced by heat insulation 5; two riser walls 3 and 4, also spaced by heat insulation 5; and a generally dome-shaped detachable cover which likewise has its inner and outer walls 6 and 7 spaced from each other by heat insulation 5.

The lower bottom plate 2 seats upon and is fastened to the top 8 of a shell 9 which has its lower end fastened to a base 10, and this base supports an electromagnetic valve 15 for controlling the admission of water to a pipe 11 which extends upwardly into the container, the valve being here shown in a type more fully disclosed in my copending application #600,877 now Patent No. 1,901,028 entitled Water heater for coffee making. The base 10 also has fastened to it a bracket 12 on which a switch clip 13 is pivoted, and this clip supports a tiltable mercury switch 14 controlling both the hereafter described main electric heating member E and the electromagnetic valve 15.

Fastened to the upper bottom plate 1, desirably centrally of the latter, is a flange 16 into which the lower end of a riser tube 17 is threaded, the bore of which tube alines with a perforation 18 in the receptacle bottom. Threaded upon the upper end of the riser tube 17 is a coupling 19, around which coupling is clamped a lever support 20 upon which a float lever 21 is pivoted on a horizontal pivot pin 22, as shown in Fig. 6. This float lever desirably is forked, so as to present the free ends of its longer arms at diametrically opposite sides of the coupling 19, and two links 23 which respectively depend from the free ends of these arms support an annular float 24, while a control rod 25 depends from the adjoined shorter arms of the lever. Adjustably connected to this control rod and in extension of the latter is a switch rod 41 which extends into the basal shell and is pivotally connected at its lower end to the switch-carrying pivoted clip 13, a flexible bellows member 42 being interposed between the said two rods and the upper receptacle bottom plate 1 to seal these rods operatively to that bottom.

Threaded into the upper end of the coupling 19 is a plug 26, desirably of insulating material, which supports and is fastened to the superposed bottoms 31 and 30 of two cup members 27 and 28 coaxial with the plug, the riser walls of the two cup members being spaced by heat insulation 29. Both the upper and the lower portions of the cup riser walls 27 and 28 are desirably cylindrical, while the intermediate portion (at least of the inner cup wall) desirably flares upwardly as shown in Figs. 1 and 4, so as to make the diameter of the mouth end of the inner cup considerably greater than that of the lower portions of this cup.

The riser wall of the inner cup 27 is continued at its upper or mouth end by a recurved flange 38 sloping downward radially outward of the cup and leading to an annular trough 39, which trough has its bottom provided with drip ports 40, these ports being desirably of quite small diameter and uniformly distributed about the axis of the annular trough.

Water is supplied to the lower portion of the inner cup by a water supply duct of which the pipe 11 forms a part, which duct also includes an upright pipe coil 37 underhanging the drip ports 40 in the trough 39. To provide for this while also permitting the twin cup, plug and riser tube assembly to be attached conveniently, I preferably make this water supply duct of two parts connected to each other at a point which is accessible when the cover 7 is detached from the body or receptacle member of the container.

For this purpose, Figs. 1 and 5 show the water pipe 11 as extending upwardly within the container and having its upper end portion 11A extending horizontally above the inner cup 27, where this pipe portion 11A is connected by a coupling 45 to the upper end portion 37A of a continuation pipe leading to the said cup. This continuation pipe includes the upright pipe coil 37 which at least partly underhangs the said drip ports, and also includes a part 37B leading from the lower end to the pipe coil to the interior of the inner cup 27.

However, I preferably do not depend on the connection of this continuation pipe to the said cup for supporting that pipe or for holding the pipe coil upright and coaxial with the water cup 27. With these latter purposes in mind, I form the pipe coil 37 by winding it on a coil support fastened to the said cup. As here shown, this coil support comprises a bottom member (Fig. 2) including a hub 32 brazed to the bottom of the outer cup 28 and radial arms 33 to each of which the lower end of a riser strip 35 is fastened, the outer ends of the arms 33 being connected by a ring portion 34 to stiffen the support. The upper ends of these riser strips may also be brazed to the bottom of the trough 39. Each riser strip 35 has its outward edge provided with recesses 36 corresponding in height to the exterior diameter of the piping of which the coil 37 is formed; so that when this piping is wound on the coil support, with the superposed turns of the coil extending respectively through superposed recesses, these turns are rigidly spaced.

Supported by the plug 26 is an electric heating member E which has its heating element 40 entirely in the part of that member disposed within the inner cup. This heating member desirably comprises an upper portion spiraled into a horizontal coil with the turns of the coil freely spaced from each other, and two shanks extending downwardly through the plug 26, each of which shanks carries a wire terminal 44 disposed within the riser tube 14, the horizontally coiled portion being spaced downwardly from the upper or mouth end of the inner cup by a minor fraction of the height of the inner cup.

When starting with the receptacle empty and the heating member E connected to an electric circuit, water entering under pressure through the water pipe 11 first fills both this pipe and the preheating coil, after which the water gradually fills the inner cup 27 and while doing this is heated by the heating member. During this rising of the water, the general upward flaring of the cup compensates somewhat for the difference between the lengths of the parts of the heating member in the upper and lower portions of the cup, and convection currents cause vapor bubbles to rise through the water more rapidly than the water pressure raises the level of the water, so that the spirally coiled upper part of the heating member acts intensively on already heated water. As the result, the boiling of the water within the inner cup is accomplished in a very short time and with such an almost complete de-aeration of the water that the stored hot water produces much more palatable beverages than the heretofore customary water heaters of the coffee urn type.

With the preheating coil 37 of quite small bore in proportion to the average interior diameter of the inner cup, and with the heating member suitably proportioned to the liquid capacity of the cup, the water in the cup will start boiling by the time the cup is initially filled. The boiled water then runs over the recurved mouth edge of the inner cup part and down the sloping guide 38 into the trough 39 at approximately its boiling temperature, and trickles out of the trough through the trough bottom perforations 41 in thin streams. Each of these streams strikes the uppermost turn of the preheating pipe coil 37, and thereafter flows successively in contact with the lower turns of that coil. Since the water is cold when admitted to this coil, the resulting exchange of heat lowers the temperature of the boiled water to one suitable for beverage purposes, and effects this by preheating the water for the cup so as to decrease the time required for boiling the water in this cup.

With the total area of the drip ports 40 of the trough considerably greater than the cross-section of the water supply duct, I can readily cause all of the boiled water to flow through these ports even if when my heater should be tilted sufficiently to cause the water to flow over the mouth of the inner cup mostly toward one side of the trough, thereby effectively securing the above described preheating of water in the pipe coil 37 even when my appliance is not seated on an exactly horizontal support.

The water dripping off the pipe coil 37 then collects within the container until its buoying action on the float 24 rocks the lever 32 and thereby depresses the control rod 25 sufficiently for tilting the mercury switch 14 to open the circuit C (Fig. 7), thereby disconnecting the heating member E from the source of current and also permitting the control valve 15 to shut off the supply of water to the pipe 11 and the cup in which the water was boiled. Then whenever stored hot water has been drawn off through the faucet 47 to such an extent that the weight of the float rocks the lever 32 sufficiently for tilting the mercury switch 14 back to the circuit-closing position 14A (shown in dotted lines in Fig. 7), the water control valve 15 again opens and the heating member E is again supplied with current. This valve may be constructed as shown in my copending application #600,877.

If a long period of time should elapse before hot water is withdrawn (through the faucet 47) after the annular hot-water storing chamber (between the inner riser wall 3 of the container and the riser tube 17) has been filled to the maximum level L for which the float mechanism is adjusted, radiation to the outer air may unduly cool this stored water below a temperature adequate for its intended purpose. To avoid this, I desirably support an auxiliary electric heating member A within the lower portion of the annular hot-water storing chamber, and also support a thermostatic switch T in heat-conducting relation to the lower portion of the said chamber. The auxiliary heater A and the thermostatic switch T are connected in series across the circuit wires W behind the connections of these wires to the tilting switch 14 and the control valve 15, and desirably also in series with a manual switch 48 whereby the user can entirely disconnect the water heater from the current supply, as shown in Fig. 7.

To avoid a burning out of the auxiliary heating member A in case the level of liquid is kept below the top of that member for a considerable length of time by withdrawals of hot water at a more rapid rate than that at which water is boiled to replenish it, I preferably dispose this auxiliary heater within a relatively larger diametered and relatively taller upright tube 49 (after the manner described in my copending application #612,531) so that this tube will still continue to store water around the said heater for a considerable time.

As a mounting for the thermostatic control switch T, I preferably provide an inverted can-like housing 50 having at its lower end a peripheral flange 51 secured to the bottom 1 of the container, and provide the lower bottom member 2 of the container as well as the bottom heat insulation 5 with an upright bore for receiving the lower end portion 52 of the said switch. Thus arranged, this switch can readily be slid upwardly into its normal position, shown in Fig. 4, so as to be responsive to the temperature of the stored hot water in the container even when this water has fallen to a quite low level.

With the bore of the water supply tube 11 quite small in proportion to the radial width of the annular hot-water storing chamber, the volume of water in the part of this tube which extends through the stored hot water is only a minute fraction of the volume of this stored water, so that the cooling effect of the water in that tube is negligible during the idle periods of my appliance. And during these same idle periods, the less warmed water in the water cup 27 is out of direct heat-conducting relation to the stored hot water, particularly if the plug-supporting coupling 19 is made of a material of poor heat conductivity.

Consequently, the stored hot water is not cooled appreciably during long idle periods of the appliance, and whenever a withdrawal of hot water causes the appliance to be actuated again, the water in the cup 27 is sufficiently hot for speedily resuming its boiling.

When the cover is detached and the wires 54 leading to the main heating member have been disconnected, a disconnecting of the coupling 45 from one of the two water duct portions between which it is interposed will permit the previously connected ends of these duct portions to be flexed laterally outward of the cup so that the plug 26 can be unscrewed from the riser pipe along with the heating member, the pipe coil and the coil support, thereby affording access to lower parts within the container and also permitting a convenient replacing of the main heating member E if needed.

The cover 7 desirably supports a vent tube V—here shown as extending through the usual cover-lifting knob 53—but is otherwise imperforate, and this vent tube preferably has its lower end disposed below the top of the outer edge of the trough 39. In practice, the shape and relative disposition of my water-boiling cup and main heating member co-operate in affording a speedy boiling without generating any considerable vapor pressure.

When the main heating member is connected to the circuit, the shapes and relative disposition of the inner or water-boiling cup and of this main heating member co-operate with the convection currents in this cup to afford the desired speedy boiling with exceedingly small vapor bubbles distributed over substantially the entire top of the water in this cup, and without generating any considerable vapor pressure. However, a vent is still needed because of the air which is continually emitted into the interior of the cover during the de-aeration of the water. For this purpose, I mount a vent tube V on the cover, which tube desirably presents its lower end below the top of the free edge of the trough 39, this vent tube being here shown as extending through the usual lifting knob 53 on the cover.

With the vent tube thus disposed, the generated vapor is almost entirely condensed within the upper part of the container by the cooling action of the pipe coil and of the portions of the water duct which are above the level L of the stored hot water. Consequently, the amount of vapor emitted through this vent tube is so small as to be readily absorbed by the air of the room in which my appliance is used, so that my liquid heater entirely avoids the steaming up of wall and ceilings which has proven so objectionable in connection with liquid heaters of the customary coffee urn types.

However, while I have heretofore described my invention in connection with a beverage water heater, I do not wish to be limited as to the liquid with which it is employed. Nor do I wish to be limited as to the details of the construction and arrangement above disclosed, since many changes may obviously be made without departing either from the spirit of my invention or from the appended claims.

I claim as my invention:

1. In a liquid heater, an upwardly open cup having its upper edge extended to present a trough of larger diameter and at lower elevation than the mouth of the cup, the trough having its bottom provided with perforations; an upright pipe coil freely surrounding the cup and partially underhanging the trough, the coil being connected at one end to a supply of liquid and at its other end to the lower portion of the cup; and means associated with the cup for heating the liquid to cause the liquid in the cup to boil over into the trough.

2. A liquid heater as per claim 1, in which the said means comprise an electric heating element supported within the cup below the level of the upper edge of the cup.

3. A liquid heater as per claim 1, in which the said means comprise an electric heater disposed within the cup and freely spaced from the riser wall of the cup, all portions of the heating element being spaced downwardly from the level of the upper edge of the cup.

4. A liquid heater as per claim 1, including means fast with respect to the cup for spacing consecutive turns of the pipe coil freely from each other.

5. A liquid heater as per claim 1, including a coil-supporting frame fast with respect to the cup and upon which frame the pipe coil is wound; the frame including riser arms spaced circumferentially of the frame, each riser arm having portions extending between successive turns of the pipe coil to space these turns from one another.

6. A liquid heater comprising a container, a cup-like receptacle supported within the upper portion of the container, means associated with the receptacle for boiling liquid in the receptacle, and a liquid supply duct disposed within the container and connected to the lower portion of the receptacle, the duct including a pipe coil surrounding the receptacle and disposed so that the boiled over liquid from the receptacle will impinge upon the coil.

7. A liquid heater as per claim 6, including heat-insulating means interposed between the riser wall of the cup and the pipe coil for deterring heat radiation radially of the cup from the said wall to the pipe coil.

8. In a liquid heater, a container comprising an upright can-like container body and a detachable cover for the same, a cup-like receptacle supported in the upper portion of the container; means associated with the receptacle for boiling liquid in the receptacle; an upright liquid-preheating coil freely surrounding the receptacle and disposed so that the boiled over liquid from the receptacle will impinge upon the said coil, lower end of the coil being connected to the lower portion of the receptacle, and the upper end of the coil having an inlet extension; a liquid supply pipe extending upwardly within the container to a point adjacent to the inlet end of the said coil extension, and a coupling detachably connecting the upper end of the liquid supply pipe with the said extension inlet end, the coupling being disposed at higher elevation than the top of the container body so as to be freely accessible when the container cover is detached.

9. A liquid heater comprising a container, a laterally imperforate tube extending upwardly from the bottom of the container and freely spaced from the riser wall of the container, a plug detachably connected to the upper end of the said tube, a receptacle supported by and sealed to the plug, an electric heating member including a heating element disposed within the receptacle and having its terminal portions extending downwardly through the plug, and two circuit wires housed by the said tube and respectively connected to the end portions of the electric heating member.

10. Means for preheating and thereafter boiling liquid, comprising an upwardly open inner cup, an electric heating member disposed within the cup, an outer cup having its riser wall concentric with and insulated against heat radiation from the riser wall of the inner cup, the inner cup having its upper edge recurved outwardly and downwardly and continued by a downwardly flaring frustro-conical guide overhanging the edge of the outer cup and leading to an annular trough, the trough having its bottom provided with drip ports; and a liquid duct leading to the lower portion of the inner cup and including an upright pipe coil having its upper turn underhanging the drip ports.

11. Liquid preheating and boiling means as per claim 10, including a coil support fast with respect to one of the cups, the coil support including spaced risers disposed radially outward of both cups, each riser having vertically spaced recesses for respectively receiving the turns of the pipe coil.

12. A liquid heater comprising an upright container having an outlet near its bottom; a cup-like receptacle supported by and within the container at a considerable elevation above the said bottom, the mouth edge of the receptacle being recurved and continued by a downwardly flaring frustro-conical flange for guiding the flow of liquid boiled over from the receptacle; an electric heater associated with the receptacle; a liquid duct leading to the lower portion of the receptacle and including an upright pipe coil freely surrounding the cup-like receptacle and underhanging the said flange; and control means for automatically controlling the supply of liquid to the said duct, the said means including a float supported within the container at lower elevation than the bottom of both the receptacle and the pipe coil.

13. A liquid heater as per claim 12, including a riser member fastened to the bottom of the container and supporting the receptacle, the control means including a float-supporting lever supported by the riser member.

14. A liquid heater comprising an upright container having a central perforation in its bottom, a riser tube supported by the said bottom within the container and alining with the said perforation, a cup-like receptacle supported by the upper end of the tube, an electric heating member including a heating portion entirely housed by the receptacle, circuit wires connected to the heating member within the riser tube and extending through the said tube; and a liquid supply duct including an inlet portion extending upwardly through the said bottom radially outward of the riser tube and an upright pipe coil disposed for engagement by liquid boiled over the edge of the receptacle, one end of the said coil leading into the receptacle.

15. A liquid heater comprising a container for storing heated liquid, a receptacle supported within the container and spaced upwardly from the bottom of the container, a duct for feeding cold liquid to the receptacle, means for heating liquid in the receptacle to cause the liquid to boil within the receptacle and over the mouth of the receptacle, and means automatically controlling the said duct to limit the level of stored liquid in the container to a predetermined downward spacing from the receptacle, the duct having a portion thereof above the said level disposed in the path of descent of liquid boiled out of the receptacle, whereby the flow of boiled-over liquid effects an interchange of heat with liquid in the said duct portion.

16. An appliance for boiling liquid and storing hot liquid at a temperature below the boiling point of the liquid, comprising a container, a receptacle supported within the upper portion of the container, means for supplying cold liquid to the receptacle, means for heating liquid within the receptacle to cause the liquid to boil over into the container, means for automatically halting both the said supplying of cold liquid and the heating of liquid when the level of boiled-over liquid in the container reaches a predetermined downward spacing from the receptacle; and means for effecting a heat interchange above the said level between boiled-over liquid and cold liquid which is being supplied to the receptacle, before this boiled-over liquid has descended to the said level.

17. An appliance for boiling liquid and affording a store of liquid at a temperature below the boiling point of the liquid, comprising a container, a cup-like receptacle supported within the container at a considerable elevation above the bottom of the container, a cold-liquid supply duct leading into the receptacle and including an upright pipe coil adjacent to the receptacle; heating means associated with the receptacle for heating liquid within the receptacle to cause the liquid to boil over and impinge upon the pipe coil; automatic means controlling both the heating means and the supply of cold liquid through the said duct for discontinuing the operation of the heating means and the supply of cold liquid when the boiled-over liquid stored in the container reaches a predetermined level spaced downwardly from the lower end of the said coil, and for resuming the operation of the heating means and the supply of cold liquid when the liquid in the container has fallen to a predetermined level intermediate of the bottom of the container and the aforesaid level.

18. A liquid boiling and hot liquid storing appliance as per claim 17, including means associated with the receptacle and spaced upwardly from the pipe coil for subdividing the boiled-over liquid into a plurality of streams before the boiled-over liquid impinges upon the pipe coil.

19. A liquid boiling and hot liquid storing appliance as per claim 17, in which the said duct extends upwardly through the boiled-over liquid stored in the container, thereby effecting an interchange of heat between the said stored liquid and cold liquid flowing through the duct to the receptacle.

LEE B. GREEN.